US006990461B2

(12) United States Patent
Bargnes et al.

(10) Patent No.: US 6,990,461 B2
(45) Date of Patent: Jan. 24, 2006

(54) COMPUTER IMPLEMENTED VEHICLE REPAIR ANALYSIS SYSTEM

(75) Inventors: Guy O. Bargnes, Grosse Pointe, MI (US); John K. Howe, Palm Harbor, FL (US); Charles Kelly, Grosse Pointe Farms, MI (US); Jean-Claude Pierre, Senden (DE); Chris W. Lavington, Roseburg, OR (US); Antonio C. Torres, Millersville, MD (US)

(73) Assignee: BASF Corporation, Southfield, MI (US)

( * ) Notice: Subject to any disclaimer, the term of this patent is extended or adjusted under 35 U.S.C. 154(b) by 0 days.

(21) Appl. No.: 10/386,051

(22) Filed: Mar. 11, 2003

(65) Prior Publication Data

US 2003/0171981 A1 Sep. 11, 2003

Related U.S. Application Data

(62) Division of application No. 09/602,922, filed on Jun. 23, 2000.

(51) Int. Cl.
*G06F 17/60* (2006.01)

(52) U.S. Cl. .................................................. 705/10

(58) Field of Classification Search ................ 705/4, 705/7–9, 11, 10
See application file for complete search history.

(56) References Cited

U.S. PATENT DOCUMENTS

| 4,392,119 | A | 7/1983 | Price et al. ................ 340/38 L |
| 5,128,861 | A | 7/1992 | Kagami et al. ............. 364/403 |
| 5,717,595 | A | 2/1998 | Cherrington et al. ..... 364/464.1 |
| 5,946,662 | A | 8/1999 | Ettl et al. ....................... 705/8 |
| 5,962,829 | A | 10/1999 | Yoshinaga ................... 235/375 |
| 6,556,974 | B1 * | 4/2003 | D'Alessandro .............. 705/10 |

OTHER PUBLICATIONS

"CCC Announces New Guidelines On-line Decision Support Tool." PR Newswire, p. 1, Nov. 2, 1998.*
Horowitz, Alan. "Smart Decision Making." Intelligent Enterprise, vol. 2, No. 8, p. 59, Jun. 1, 1999.*
Anonymous. "Wish List for the Millennium." Bodyshop Business, vol. 18, No. 11, p. 107, Nov. 1999.*
Moad, Jeff. "Data For Sale." PC Week, vol. 15, No. 31, p. 59, Aug. 3, 1998.*
"Mitchell International Teams With Carstation.com." PR Newswire, p. 6470, Sep. 15, 1999.*
Carter, Russell A., "Repairs in Progress." Coal Age, vol. 102, pp. 18-21, Mar. 1997.*

* cited by examiner

Primary Examiner—Susanna M. Diaz

(57) ABSTRACT

A computer-implemented method is provided for analyzing and prioritizing business aspects of a vehicle-related multi-step process. The method calculates a relative strength of a particular category for the vehicle-related business. The method then assigns a strength indicator for the particular category based upon the calculations. The method also analyzes the performance, projections, and production workforce shift profiles for the vehicle-related business.

18 Claims, 12 Drawing Sheets

2020 Recap: Performance - Priorities - Projections

Performance — 200 — 216

| Selected Key Performance Indicators | Your Shop | Ind Guides | Top 25% | |
|---|---|---|---|---|
| 1 Total Sales $ (Annualized) | $1,340,000 | N/A | N/A | |
| 2 Total Gross Profit Percent | 38.5% | 40.0% | 43.5% | Opportunity |
| 3 Production Proficiency | 115% | 135% | 150% | Opportunity |
| 4 Production Staffing Density (Main Shift) | 2.3 : 1 | 2.0 : 1 | 1.7 : 1 | |
| 5 Monthly Sales / Administrative Emp | $23,500 | $35,000 | $45,000 | Opportunity |
| 6 Monthly Sales / Estimator | $111,500 | $140,000 | $160,000 | |
| 7 Paint Cost / Paint Hr Billed | $6.50 | $7.00 | $6.00 | |
| 8 Monthly Gallons Waste / Paint Tech | 5 | 5 | 2 | |
| 9 Overal Customer Satisfaction Index | 91.3% | 90% | 95.5% | |
| 10 Gross Profit $ per Tech Clock Hour | $27.40 | $35.00 | $45.00 | Opportunity |

220, 222

Priorities — 204 — 240

| Business Areas & Priorities In Each | Priority | Strength | |
|---|---|---|---|
| 1 Financial Measures | | | Tab 1 |
| 2 Financial Perfomance | | | Tab 2 |
| 3 Sales & Marketing | | | Tab 3 |
| 4 Customer Satisfaction Index | | | Tab 4 |
| 5 Insurance Relations inc. Cycle Time | | | Tab 5 |
| 6 Administraion - General | | | Tab 6 |
| 7 Administration - Parts | | | Tab 7 |
| 8 Production - General | | | Tab 8 |
| 9 Production - Refinish | | | Tab 9 |
| 10 Facility - Capacity, Equipment, Layout | | | Tab 10 |
| 11 Personnel inc. Pay Plans & Incentives | | | Tab 11 |

244, 248, 272

Projections — 208 — 250

| Performance Factors | Sales | Gross Profit | GP$ Improved |
|---|---|---|---|
| 1 Current Performance (Annualized) | $1,340,000 | $516,000 | N/A |
| 2 With 10% improvement in Production Proficiency | $1,470,000 | $540,000 | $24,000 |
| 3 Performance with One Additional Technician | $1,500,000 | $550,000 | $34,000 |
| 4 With 10% improvement in Parts : Labor Ratio | $1,400,000 | $530,000 | $14,000 |
| 5 With 2% improvement in Labor Gross Profit | $1,340,000 | $521,000 | $5,000 |
| 6 With 2% Improvement in Parts Gross Profit | $1,340,000 | $520,000 | $4,000 |
| 7 With 2% improvement in Materials Gross Profit | $1,340,000 | $518,000 | $2,000 |
| 8 With Cumulative Impact of All Improvements | $1,600,000 | $640,000 | $124,000 |

Production Workforce Shift Profile — 212

| Main Shift Only | Main Shift Plus OT or Sat | Main Shift & 2nd Shift | Main Shift, 2nd Shift & Sat |
|---|---|---|---|
| | | | |

Customer Vehicle Tracking and Cycle Time Assessment — Updated: _____

| RO # | Cust Name | Veh Brand | Veh Year | Date Asgnd | Record reason for each day of 'Production Lost' | | | | | | | Date Compl | Final Amt $ | Target vs. Actual Days | | | | Insurance Co |
|---|---|---|---|---|---|---|---|---|---|---|---|---|---|---|---|---|---|---|
| | | | | | D-Asam | Frame | Metal | Prep | Paint | R-Asm | Test | | | Lbr-Hrs Sold | Lbr-Hrs div by 5 | Actual Days | Cycle Tm Proficy | |

Note: Form shows Vehicle Tracking Chart combined with Cycle Time Measurement (by noting each day of delay) and Cycle Time Analysis (by a code for each type of delay)

Instructions:
1. When car enters each step: "—"
2. Each day t., review all vechicles.
3. If 5 hrs worked, note nothing.
4. If not, enter reason for delay.

Codes for reasons for delay:
P1 Parts Delayed    I1 Ins Approval    S1 Frame Dept
P2 Parts Incorrect    I2 Ins Supp Approval    S2 Metal Dept
P3 Parts Damaged    I3 Other Ins    S3 Paint Dept
P4 Parts Fit                               S4 Emp Out
                           Cx CUSTOMER            S5 Sublet Note additional days of delay in front of code.
Example:
2P2 (2 days for incorrect parts)

FIG – 5

Sales & Marketing: Selling and Sources of Business
Note: This is the Sales & Marketing 'Sub-Page', the 1st of 11 Sub-pages

|   | N/A | Weak | Avg | Strong |

1 Customer 1st Impression of Your Facility
    Checklist and Action Planner — Link to Detail Below
350

2 Customer 1st Impression of Your Employees
    Checklist and Action Planner — Link to Detail Below 3 2nd Impressions
    Checklist and Action Planner — Link to Detail Below 4 Sales Close % on Estimates Written
    Checklist and Action Planner — Link to Detail Below 5 Maximizing Repeat & Customer Refferals
    Checklist and Action Planner — Link to Detail Below 6 Maximizin Insurance DRP Business
    Cycle Time Performance (CTP) — Link to Unique Cycle Time Measurement Tools
    Checklist and Action Planner — Link to Detail Below 7 Maximizing Employee Refferals
    Checklist and Action Planner — Link to Detail Below 8 Maximizing Dealership & Fleet Referrals
    Checklist and Action Planner — Link to Detail Below 9 Maximizing 'Exposure' of Location
    Checklist and Action Planner — Link to Detail Below 10 Advertising & Marketing Promotion
    Checklist and Action Planner — Link to Detail Below 11 Yellow Pages & Directories
    Checklist and Action Planner — Link to Detail Below

FIG - 6

Sales & Marketing: Selling and Sources of Business

Note: This is a portion of the detail of the Sales & Marketing 'Sub-Page', the 1st of 11 sub-pages

|  | N/A | Weak | Avg | Strong | Add to 90-Day Plan | Add to One-Year Plan |
|---|---|---|---|---|---|---|

380

1 Customer 1sty Impression of yYour Facility
  Overall Impression from street
    Signage
    General Appearance of Building
    Clear wide enttrance
  Appearance of Parking Area
    Parking places available
    Parking places well marked
    Estimating area marked
  Appearance of Reception Area
    Clean
    Comfortable 2 Customer 1st Impression of Employees
    Telephone Answering & Handling
      Prompt
      Strong & Courteous Greeting
      Consistent greeting by all
      Back-up answering responsibility
    Customer Service Representatives
      Consistently courteous
      Consistently Professional
      Consistently Customer Focused
    Impression of sales representatives
      Consistently Courteous
      Consistently Professional
      Consistently Customer Focused 3 2nd Impressions
    Reception Area: Info on Display
      Steps in the Repair Process
      Refinish Warranty
      Employee Training Certifications
      Photos / Testimonials
    Production Area
      Neat & Clean 100% of time
      Employees in Uniforms

FIG - 7

Sales & Marketing: Selling and Sources of Business

Note: This is the same Sales & Marketing 'Sub-Page', as it might appear completed

|   | N/A | Weak | Avg | Strong |
|---|---|---|---|---|

1 Customer 1st Impression of Your Facility
    Checklist and Action Planner — Link to Detail Below
    — 384

2 Customer 1st Impression of Your Employees
    Checklist and Action Planner — Link to Detail Below 3 2nd Impressions
    Checklist and Action Planner — Link to Detail Below 4 Sales Close % on Estimates Written
    Checklist and Action Planner — Link to Detail Below 5 Maximizing Repeat & Customer Refferals
    Checklist and Action Planner — Link to Detail Below 6 Maximizin Insurance DRP Business
    Cycle Time Performance (CTP) — Link to Unique Cycle Time Measurement Tools
    Checklist and Action Planner — Link to Detail Below 7 Maximizing Employee Refferals
    Checklist and Action Planner — Link to Detail Below 8 Maximizing Dealership & Fleet Referrals
    Checklist and Action Planner — Link to Detail Below 9 Maximizing 'Exposure' of Location
    Checklist and Action Planner — Link to Detail Below 10 Advertising & Marketing Promotion
    Checklist and Action Planner — Link to Detail Below 11 Yellow Pages & Directories
    Checklist and Action Planner — Link to Detail Below

FIG - 9

Glasurit Leaders Group - Member Data Entry Form

Name of Business
Steet Address
City, State, Zip

Contact
Title
Phone
Fax
e-mail

Dealer ☐ or Independent ☐
If Dealer, please list primary franchise(s)

Part of multiple shop ownership group? Yes ☐ No ☐
Name of group

Data covers how many months?
Final month of data
Today's Date (Mo / Yr)

Management System(s)

Estimating System(s)

Priorities

| | Opportunities / Weaknesses vs. Management Strengths | | | | |
|---|---|---|---|---|---|
| | Weak | | Average | | Strong |
| Financial Measures | ☐ | ☐ | ☐ | ☐ | ☐ |
| Financial Performance | ☐ | ☐ | ☐ | ☐ | ☐ |
| Sales & Marketing | ☐ | ☐ | ☐ | ☐ | ☐ |
| Customer Satisfaction | ☐ | ☐ | ☐ | ☐ | ☐ |
| Insurance Rel & CTP* | ☐ | ☐ | ☐ | ☐ | ☐ |
| Admin - General | ☐ | ☐ | ☐ | ☐ | ☐ |
| Admin - Parts | ☐ | ☐ | ☐ | ☐ | ☐ |
| Production - General | ☐ | ☐ | ☐ | ☐ | ☐ |
| Production - Refinish | ☐ | ☐ | ☐ | ☐ | ☐ |
| Facility-Equip-Layout | ☐ | ☐ | ☐ | ☐ | ☐ |
| Personnel-Pay Plans | ☐ | ☐ | ☐ | ☐ | ☐ |

}88

Facility, Employees & Shift Profile

84 {
No. of Metal Stalls inc. Frame
Number of Metal Techs
No.Refinish Stalls inc. Booth
Number of Paint Booths
Number of refinish Techs
No. Detaling Stalls
No. of Detailing Techs
No. Mechanical/Other Stalls
No.Mechanical/Other Techs
Total # of Work Spaces
Total # of Technicians No. Admin Emp inc. Estimators
Memo: No. Estimators Sales Close Rate %
Number of RO's for time period Overall Cust. Sat. Indesx (CSI)

Production Dept Square Feet 84
88
84

| Number of Technicians by Shift / by Day | Monday | | Tuesday | | Wednsday | | Thursday | | Friday | | Saturday | |
|---|---|---|---|---|---|---|---|---|---|---|---|---|
| | Number of Techs | Average Hours | Number of Techs | Average Hours | Number of Techs | Average Hours | Number of Techs | Average Hours | Number of Techs | Average Hours | Number of Techs | Average Hours |
| Day Shift | | | | | | | | | | | | |
| Overtime | | | | | | | | | | | | |
| Afternoon Shift | | | | | | | | | | | | |

Glasurit Leaders Group - Member Data Entry Form

Sales, Gross Profit, Hours Sold & Hours Worked

| | | | |
|---|---|---|---|
| Metal Labor Sales $ | | Metal Labor Hours Sold | |
| Metal Labor Gross Profile $ | | Metal LaborClock Hours | |
| Refinish Labor Sales $ | | Refinish Labor Hours Sold | |
| Refinish Labor Gross Profit $ | | Refinish Labor Clock Hours | |
| Frame Labor Sales $ | | Frame Labor Hours Sold | |
| Metal Labor Gross Profile $ | | Frame Labor Clock Hours | |
| Warranty Labor Sales $ | | Warranty Labor Hours Sold | |
| Warranty Labor Gross Profit $ | | Warranty Labor Clock Hours | |
| Internal Labor Sales $ | | Internal Labor Hours Sold | |
| Internal Labor Gross Profit $ | | Internal Labor Clock Hours | |
| Mechanical & Other GP $ | | Mechanical & Other Hrs Sold | |
| Mechanical & Other GP $ | | Mechanical & Other Clock Hrs | |
| Total Labor Sales $ | | Total Labor Hrs Sold | |
| Total Labor Gross Profit $ | | Total Labor Clock Hours | |

84 { (left column)    80,84 (right column)

| | |
|---|---|
| Part Sales $ | |
| Parts Gross Profit $ | |
| Refinish Materials Sales $ | |
| Refinish Materials Gross Profit $ | |
| Sublet Sales $ | |
| Sublet Cost of Sales | |
| Total Sales $ | |
| Total Gross Profit $ | |

| | |
|---|---|
| Paint Only Cost of Sales | |
| Monthly Gallons of Waste Cost to Remove | |
| Door Labor Rate $ / Hr | |
| Mechanical Rate $ /Hr | |
| Matl Allowance / Refinish Hour | |

| | |
|---|---|
| Fixed Overhead - Building $ | |
| Fixed Overhead - Admin Staff $ | |
| Variable Overhead $ | |
| Total Overhead $ | |
| Net Profit $ | |

Memo: Selected Variable Overhead Values

| | |
|---|---|
| Media Advertising | |
| Yellow Pages / Directories | |
| Other Promotions | |
| Policy Adjustments | |
| Training - Admin Staff | |
| Training - Technicians | |

| Technician Production Efficiency | Stalls per Technician Main Shift Only |
|---:|---:|
| 186 | 1.0 |
| 184 | 1.2 |
| 173 | 1.4 |
| 165 | 1.5 |
| 160 | 1.6 |
| 159 | 1.6 |
| 153 | 1.7 |
| 152 | 1.8 |
| 149 | 1.8 |
| 144 | 1.8 |
| 140 | 1.8 |
| 139 | 1.9 |
| 138 | 1.9 |
| 135 | 1.9 |
| 134 | 1.9 |
| 131 | 1.9 |
| You are here → 130 | 1.9 |
| 129 | 2.0 |
| 129 | 2.0 |
| 128 | 2.0 |
| 124 | 2.0 |
| 122 | 2.0 |
| 120 | 2.1 |
| 120 | 2.2 |
| 119 | 2.2 |
| 118 | 2.1 |
| 117 | 2.3 |
| 116 | 2.3 |
| 114 | 2.3 |
| 113 | 2.4 |
| 113 | 2.4 |
| 112 | 2.4 |
| 111 | 2.4 |
| 110 | You are here → 2.6 |
| 110 | 2.7 |
| 109 | 2.8 |
| 106 | 2.9 |
| 105 | 2.9 |
| 103 | 2.9 |
| 102 | 3.0 |
| 100 | 3.0 |
| 99 | 3.0 |
| 98 | 3.0 |
| 98 | 3.1 |
| 95 | 3.2 |
| 93 | 3.2 |
| 92 | 3.2 |
| 90 | 3.5 |
| 88 | 3.5 |
| 87 | 4.0 |

*Value from recent sample of 50 shops.

FIG - 11

COMPUTER IMPLEMENTED VEHICLE REPAIR ANALYSIS SYSTEM

CROSS-REFERENCE TO RELATED APPLICATION

The present application is a divisional application of U.S. Ser. No. 09/602,922, filed Jun. 23, 2000, which is incorporated herein by reference.

BACKGROUND OF THE INVENTION

1. Field of the Invention

The present invention relates generally to a computer-implemented vehicle processing facility analysis system, more particularly, to a method of analyzing and prioritizing a vehicle-related business.

2. Background

Vehicle repair shops or facilities handle a large volume of vehicles. Vehicles remain many days within the shops since the repair process has many time consuming steps. For example in a typical collision repair process, vehicles undergo a vehicle disassembly step, frame repair step, metal repair step, preparation step, painting step, reassembly step, and testing step. Delays invariably arise from a number of sources. Exemplary delay sources include the incorrect parts being delivered or insurance companies slowly processing vehicle collision claims.

Due to the large volume of vehicles that repair shops handle, managers find it difficult to correctly diagnose what delays occur enough times to warrant correction. The delays that occur most frequently might be able to be diagnosed. However, delays that occur less frequently escape detection and correction.

Not only is the diagnosis of vehicle delays problematic, but it is difficult for an owner of a repair shop to obtain, in a relatively straightforward way, a comprehensive view of how the shop is performing in terms of facility potential, profit potential and other factors relative to other shops, let alone know how it is performing relative to the top vehicle repair shops. Business analysis software packages exist, but are typically not directed to the combination of many specifics (e.g., cycle time analysis, facility shift, and other factors) of a vehicle repair shop, and therefore are less complete. A non-limiting specific example includes the amount of paint used by technicians in the repair process. Typical business analysis software packages are not directed to analyzing the usage of paint and how such usage compares with other shops.

SUMMARY OF THE INVENTION

The present invention overcomes the aforementioned disadvantages as well as other disadvantages. In accordance with the teachings of the present invention, a method of analyzing and prioritizing a vehicle-related business is provided. The method utilizes a computerized analysis module having a plurality of data entry forms. The method comprises the steps of: determining a number of categories for the vehicle-related business and storing the categories in the analysis module; associating at least one data entry form with each of the categories; linking each of the categories to the associated data entry form through the analysis module; inputting data into at least one of the data entry forms linked to a particular category; automatically calculating a relative strength of the particular category based upon the inputted data; and assigning a strength indicator for the particular category based upon the calculations.

Further areas of applicability of the present invention will become apparent from the detailed description provided hereinafter. It should be understood, however, that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein:

FIG. 4 is a computer screen display depicting a succinct recap of business performance, priorities, projections, and production workforce shift profile that was generated in accordance with the teachings of the present invention;

FIG. 5 is a computer screen display depicting a vehicle tracking and cycle time assessment data processing screen;

FIG. 6 is a computer screen display depicting the display of data associated with sales and marketing data;

FIG. 7 is a computer screen display depicting the entry and display of detailed data associated with sales and marketing data of FIG. 6;

FIG. 9 is a computer screen display depicting the display of data that was provided via the computer screen of FIG. 7;

FIGS. 10a and 10b are a computer screen display depicting the entry and display of company financial data, owner's priority data, personnel & facility data, and technician workshift data; and FIG. 11 depicts a computer screen showing how an user's shop compares to other shops in selected measures.

DETAILED DESCRIPTION OF THE PREFERRED EMBODIMENT

Figure 1:
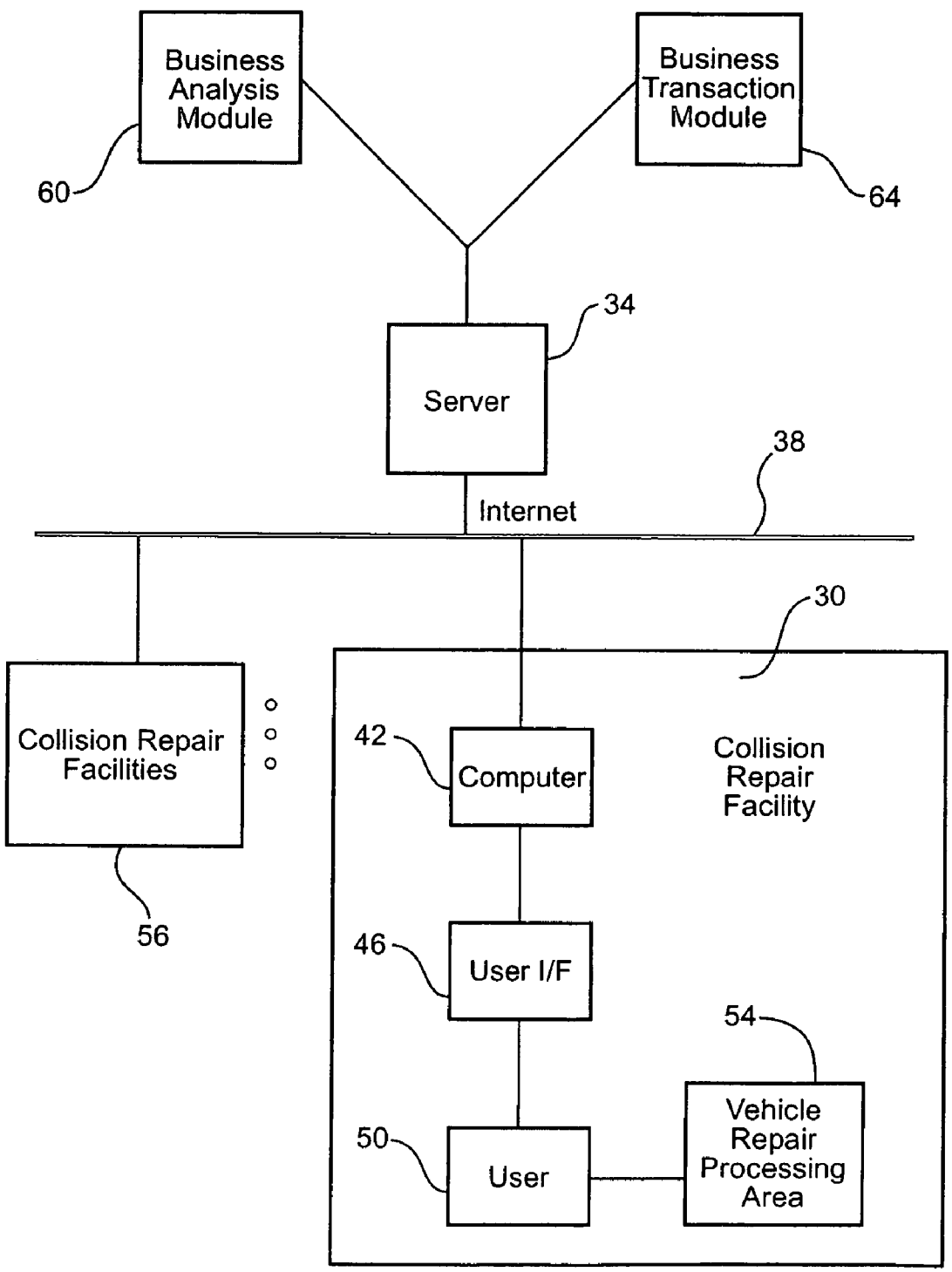
FIG. 1 is a system block diagram depicting the computer-implemented vehicle facility repair analysis system.

FIG. 1 depicts a collision repair shop or facility 30 being connected to a business analysis and transaction computer server 34 via a network such as the Internet 38. The collision repair facility 30 uses the computer server 34 to analyze the collision repair facility's performance, priorities, business projections and workforce shifts.

At collision repair facility 30, a computer 42 provides an interface 46 for a user 50 to communicate with computer server 34. In the preferred embodiment, computer 42 is situated within the repair facility 30 so that the status of a vehicle can be efficiently tracked as it is being repaired in the facility 30. However, it is to be understood that the present invention is not limited to the user 50 being only situated within the collision repair facility 30, but also includes an user physically remote from the facility 30 but has knowledge of the vehicle's status in the facility 30.

The user 50 provides financial and other facility-related data so that business analysis module 60, that resides on computer server 34, can analyze the user-provided data. Business analysis module 60 examines user-provided financial, facility, personnel information, and priority assessment data to provide to the user 50 an assessment of the collision repair facility's strengths, weaknesses, areas of opportunities, and business projections. For example, business analysis module 60 can indicate to the user 50 that based upon the user-provided input data the facility 30 has an opportunity for growth relative to industry guidelines. The module 60 can also indicate to the user 50 how well the facility 30 is doing relative to the top 25% of all other collision repair facilities.

As another non-limiting example, the business analysis module 60 receives from the computer 42 vehicle repair processing cycle time data. The cycle time data includes not only at what step a vehicle is within the vehicle repair process, but also includes delay reasons and delay time amounts for any delays that have occurred at a step in the repair process. The business analysis module 60 uses the data to identify whether the facility 30 has as one of its strengths a relatively fast time to process a vehicle repair.

The business analysis module 60 also can indicate what equipment the facility 30 can use to actualize opportunities or to overcome weaknesses in one or more areas. A business transaction module 64 interacts with business analysis module 60 and the user 50 to automate the process of buying for the user 50 the equipment that would improve the operations of facility 30. For example, if the business analysis module 60 had identified that the facility 30 has a chronic problem of a shortage of movable carts. The business transaction module 64 is used to identify for the user 50 sellers of movable carts. In this manner, the purchase of needed items is automated for the user 50.

In the preferred embodiment of the present invention, a paint supply company provides the present invention to the owner of a collision repair shop. Through use by the owner of the transaction module 64 to purchase items, the present invention can recommend products and services offered by the paint supply company, or products and services offered by companies that have co-branded with the paint supply company. The paint supply company providing the present invention also increases loyalty of the owner to the paint supply company even if no non-paint items are ordered.

Due to the networked environment in the preferred embodiment of the present invention, multiple collision repair facilities 56 can use the computer server 34 to analyze and to transact business. However, it should be understood that the present invention can also be given to the users 50 on a computer storage medium (such as a CD-ROM). The user 50 uses the software to analyze and transact business.

Figure 2:
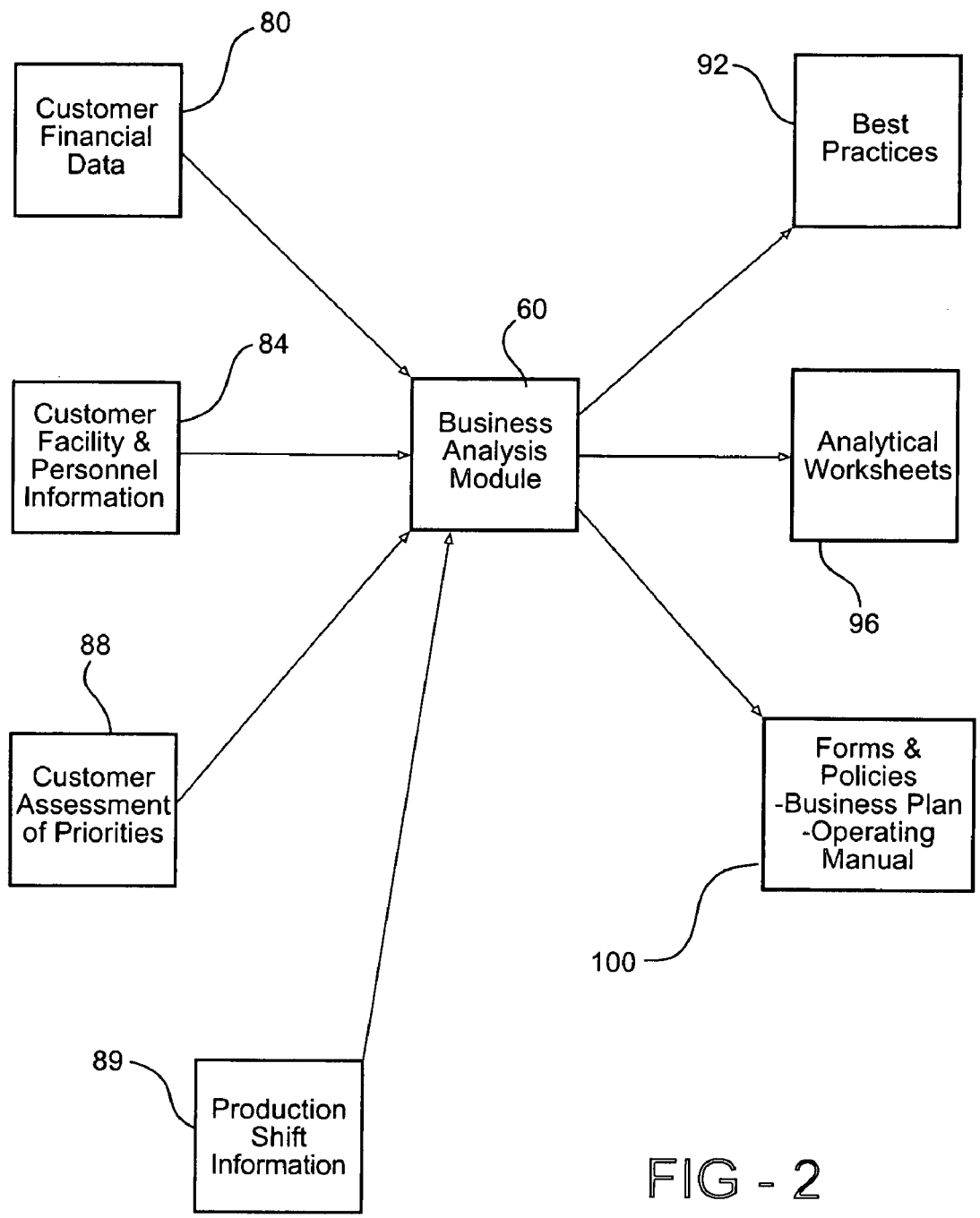
FIG. 2 is a software module data flow diagram depicting the data flow among software modules of the present invention utilized to generate business analysis data.

FIG. 2 depicts data input and processing performed by the business analysis module 60. A user provides customer financial data 80, customer, facility and personnel information 84, customer assessment of priorities 88, and production shift information 89 in order for business analysis module 60 to identify best practices 92, analytical worksheets and reports 96, and forms and policies of the business 100. For example, customer financial data 80 can include refinish labor sales and other data items depicted in FIGS. 10a and 10b shown by reference numeral 80. Customer, facility and personnel information 84 can include the number of metal stalls including frame and other data items depicted in FIGS. 10a and 10b shown by reference numeral 84. Customer assessment of priorities 88 can include prioritizing financial measures and other items depicted in FIGS. 10a and 10b shown by reference numeral 88. Production shift information 89 can include the number of day shift technicians and other data items depicted in FIGS. 10a and 10b shown by reference numeral 89.

The present invention associates many best practices with the correct form to use. An example of such an association between best practice and the correct form is the efficient capability to track vehicle and cycle time (for example, see FIG. 5). By clicking on the form to include it in the shop owner's personal inventory, the shop owner can create a customized Operations Manual.

Figure 3:
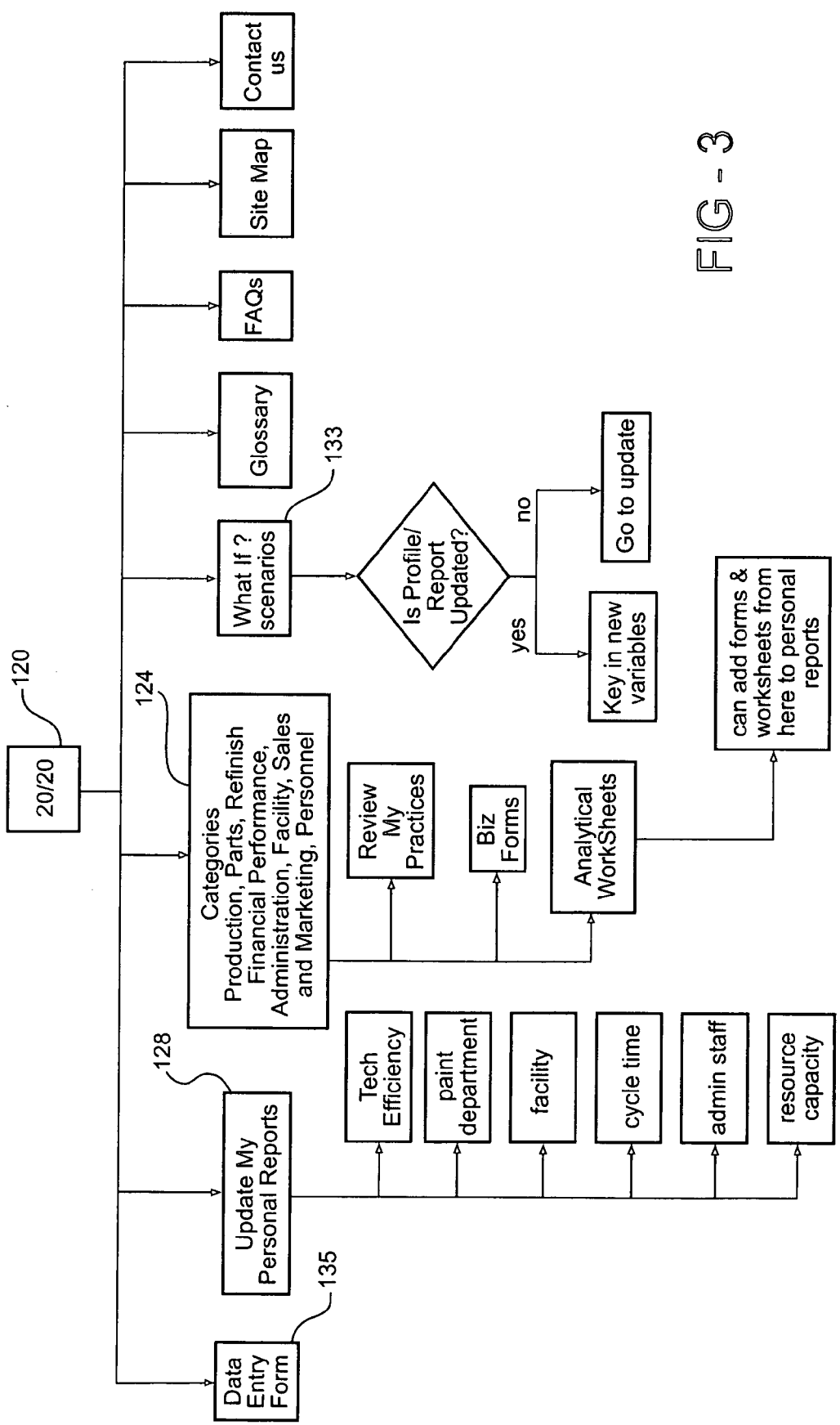
FIG. 3 is a structure chart depicting a web site architecture of the present invention.

In order to most efficiently and effectively acquire and generate the desired information, a website is provided to the user as depicted in FIG. 3. At the top of the structure, is a 20/20 recap web page 120 that provides a succinct presentation of key performance indicators (KPIs), business owner's priorities, financial projections, and the production workforce shift profile associated with the facility. In order to provide the data needed to generate the succinct business presentation, various data input web pages are provided, such as the categories web pages 124 and the update my personal reports web page 128. The category web pages 124 allow the user to enter data into the present invention (see, for example, FIGS. 6–9). The update web pages 128 allow the user to customize reports to better fit the particular needs of the user.

"What if? scenarios" web pages 133 allow the user to examine the effect of changing certain parameters, such as financial parameters, upon the user's facility. A data entry web page 135 allows the user to provide data specifically for the 20/20 recap results summary web page 120. An example of data entry web page 135 is FIGS. 10a and 10b.

FIG. 4 depicts a 20/20 recap which is a succinct presentation by the present invention of how well the collision repair facility is doing. Within the preferred embodiment of the present invention, the following areas or their equivalent are provided: a performance summary 200, a priority summary 204, a projection summary 208, and a production workforce shift profile summary 212.

The performance summary 200 is generated using a performance data structure with the structure depicted within region 216. The business performance data structure includes selected key performance indicators, facility/shop data, industry guidelines, a top 25% indicator, and whether opportunities exist to improve the business. For example, a key performance indicator within data structure 216 includes a production proficiency amount for the facility, industry guidelines, and top 25% indicator. As another example, total gross profit percent is provided for the shop, industry guides, and top 25%. An opportunity in this example has been identified by the present invention that the user's shop has a total gross profit percent of 38.5% which is below the 40.0% industry guideline and well below the top 25% value of 43.5%. An opportunity indicator 220 is generated by the present invention for the user to explicitly show that the user's shop can grow in this area in order to be more competitive relative to other shops. Specific aspects of the shop, such as paint, can be studied and analyzed by the present invention. For example, monthly paint gallons of waste per paint technician is provided as an indicator for the user to review.

As another example, opportunity indicator 222 is generated by the present invention for the user to explicitly show that based upon the shop's monthly sales and number of staff employees the user's shop can most likely generate additional profits without adding staff.

In the preferred embodiment, performance data structure 216 includes the following indicators: annualized total sales amount, total gross profit percent, production proficiency, production staffing density (main shift), monthly sales per administrative employee, monthly sales per estimator, paint cost per paint hour billed, monthly gallons waste per paint technician, overall customer satisfaction index, and gross profit dollar amount per technician clock hour.

With selected performance indicators such as efficiency and staffing density, the user sees a spectrum of actual values and the shop's position on the spectrum. The user is neither intimidated by group averages that are high nor stifled by a low target. The user will find the performances of real shops at the shop owner's current performance and at any level of performance considered.

For example, FIG. 11 depicts a computer screen showing how an user's shop compares to other shops, and not just how the user's shop compares with the top 25% of all shops. In this example, column 237 on FIG. 11 depicts that the user's shop is above average for technician production efficiency relative to other shops as shown by reference numeral 241. Column 239 depicts that the user's shop is below average for stalls per technician (main shift only) as shown by reference numeral 243.

With reference back to FIG. 4, a business priorities data structure is depicted within region 240 in order to store and to display business priority information relevant to the user's shop. The business priorities data structure 240 includes business areas and indicators as to how strong the shop is within the areas. For example, a priority as selected by the user is the financial performance of the shop. Based upon the user's financial input data in this example, the financial performance of the shop is indicated as being relatively weak by the owner as shown by the strength indicator 244. If the user wanted to see the data and the calculation methods by which key performance indicators 200 were generated, the user clicks upon tab 248 to obtain greater detail about the data used to generate the performance indicators 200. In the preferred embodiment, the business priorities data structure 240 includes financial measures, financial performance, sales and marketing, customer satisfaction index, and insurance relations including cycle time, administration (general), administration (parts), production (general), production (refinish), facility (capacity, equipment, layout), and personnel including pay plans and incentives.

A projections summary 208 uses a data structure 250 to handle the projections data associated with the shop. The data structure 250 includes performance factors, sales, gross profit, the additional amount of gross profit that would be generated given a certain level of improvement. The projections data structure 250 allows the user to pose "what if" scenarios for assessing how much improvement the user shop would experience given different situations.

For example, the second performance factor in the projections data structure 250 is directed to posing a "what if" scenario of what would be the increase in profits with a 10% improvement in production proficiency. Based upon the user's supplied input data, the projections module determines that with the a 10% improvement in production proficiency, the gross profit of the shop would be improved by $24,000 with sales of $1,470,000 and a gross profit of $540,000.

In the preferred embodiment, the projections data structure 250 includes the following performance factors: current performance (annualized), "with 10% improvement in production efficiency", "performance with one additional technician", "with 10% improvement in parts:labor ratio", "with 2% improvement in labor gross profit", "with 2% improvement in parts gross profit", "with 2% improvement in materials gross profit", and "with cumulative impact of all improvements".

The production workforce shift profile summary 212 is generated using a production workforce data structure 260 that includes main shift only data, main shift plus overtime or Saturday data, main shift and second shift data, and main shift, second shift and Saturday data. Within the summary 212, the dark portions 264 indicate that the shop has a main shift, plus an overtime shift, while the lighter portions 268 indicate that there is not a second shift nor a Saturday operations shift. The present invention utilizes, within the data structure 260, a breakout of the main shift from the other shifts, such as the second shift. In this manner, the present invention is better able to assess facility utilization and potential for greater facility utilization. By the present invention's identifying main shift employees separately from second shift employees, the shop owner can not only obtain a better perspective of the utilization of the facility, but also have a more practical evaluation of actual stalls per technician for the primary shift.

If the user wanted to see how the data was generated or to input new data into the business analysis module 60, the user identifies within the priority summary section 204 which priority detail needs examination. As an example, if the user wanted to enter in data for the first time relative to "insurance relations including cycle time", which is the fifth priority within the summary section 204, the user clicks upon tab button 272. Upon clicking tab button 272, the user is directed to the insurance and cycle time area which would include the computer screen of FIG. 5.

FIG. 5 depicts a data entry and data display computer screen related to vehicle tracking and cycle time measurements and assessments. The present invention uses a data structure 304 with the attributes listed in row 300 or equivalents thereof.

The cycle time data structure 304 includes a vehicle identifier to uniquely identify a vehicle that is undergoing a repair process. For example, the vehicle can be identified by a unique repair number supplied by the shop, a customer name, vehicle brand, vehicle year, and beginning date of the repair.

The data structure 304 also includes the steps which the vehicle is to undergo for repair. If the repair is due to a vehicle accident which would include a vehicle frame reconstruction and repainting, then typical repair steps include the vehicle disassembly step, frame repair step, metal repair step, preparation step, painting step, reassembly step, and testing step. The data structure 304 not only tracks what step a vehicle is presently at but also includes whether a vehicle remains at a step for time greater than a predetermined amount. In the preferred embodiment, codes as shown in region 308 are placed at a step where a delay has occurred. For example, a "P1" code is used to indicate that the reason for delay was that there was a delay in delivery of the parts. A number preceding the code indicates the amount of time associated with the delay. In the preferred embodiment, the number indicates the additional days of delay, such as, for example, "2P2" indicates that there was a two day delay at a particular step due to incorrect parts being delivered. Accordingly, if for a vehicle at the frame repair step the code "2P2" appears, this indicates that there was a delay for two days for a vehicle where the frame could not be operated upon due to incorrect parts being delivered.

If a particular shop receives an inordinate amount of code "P2's", then this would indicate that there is a chronic problem of incorrect parts being delivered, possibly for example from a single source for a single brand of vehicle. This delay would adversely affect the strength indicator for cycle time and would also indicate that the problem could be addressed such as by possibly ordering parts from another supply shop for vehicles of that brand.

In the preferred embodiment, the present invention also includes the source category of the parts, such as whether the parts category is an OEM (original equipment manufacturer) parts category, or an after market parts category, or a salvage parts category, or other types of parts category. Another embodiment includes using additional attributes to store the source category of the parts.

The data structure 304 includes the date upon which the vehicle's repair was completed as well as the final total amount expended to perform the repair. Thus, the data structure 304 not only tracks the vehicle through a multi-step process, but also performs cycle time measurement by noting the amount of time of delay. The present invention performs cycle time analysis by providing the reason for the delay.

In the preferred embodiment, when a car enters each step, a symbol such as a "--" is entered in the data structure 304. Each day, all vehicles in the vehicle repair facility are reviewed. If a vehicle has been worked upon for at least five hours, then nothing additionally is noted for the vehicle in data structure 304. However, if less than five hours has been expended for working upon a car, then the reason for the delay as well as the current delay time amount is entered into the appropriate step in the data structure 304.

The data structure 304 also includes target analysis where desired target time repair values are compared against the actual time expended to repair a vehicle. In the preferred embodiment, the target analysis includes the number of labor hours sold, the labor hours divided by five hours, actual business days expended to repair the vehicle, and a cycle time efficiency metric. For example, if the number of labor hours sold to complete a vehicle repair process was 30 hours, the labor hours divided by 5 value would be 6. If the actual days expended was 7 instead of the targeted six days, then the cycle time efficiency would indicate that 1 day had been lost.

The data structure 304 includes the insurance company being associated with a vehicle repair in order to capture delays associated with an insurance company. For example, if an inordinate number of "I1" insurance approval delay codes have been entered in the data structure 304 for a particular insurance company, then the owner of the vehicle can be told that the reason for the delay was not the repair shop, but rather the insurance company that the vehicle's owner presently uses and that this insurance company is chronically late inspecting damaged vehicles.

FIG. 6 provides an example of an user entering and viewing the detailed information used to generate sales and marketing summary information. In particular, FIG. 6 is associated with the selling and sources of the business. The present invention provides multiple areas in this category for the user to provide information about their business. For example, the present invention asks for information related to a customer's first impression of the user's facility. A user clicks upon a button 350 via a pointing device (such as a computer mouse) to see more detailed questions asked by the present invention as well as have access to an action planner for adding particular checklist items to the user's business plan. Upon clicking the button 350, the user in this example is taken to the computer screen depicted in FIG. 7.

With respect to FIG. 7, more detailed questions are asked about the user's facility. For example, regarding the customer's first impression of the facility, more detailed information is gathered via region 380. Questions include but are not limited to the user ranking overall impression of the shop from the street as being nonapplicable, weak, average or strong. Even more detailed questions may be asked regarding the overall impression by focusing the user upon the shop's signage, general appearance of the building and whether the shop has a clear and wide entrance. If the user deems necessary, such as if the user upon reflection believes that one or more of these questions indicate a weakness, the user can select to add this particular question to a 90-day business plan of the facility or add it to a one-year business plan of the facility. It should be understood that the present invention also includes the present invention allowing the user to bypass FIG. 6 and proceed directly to the detailed questions of FIG. 7.

Figure 8:
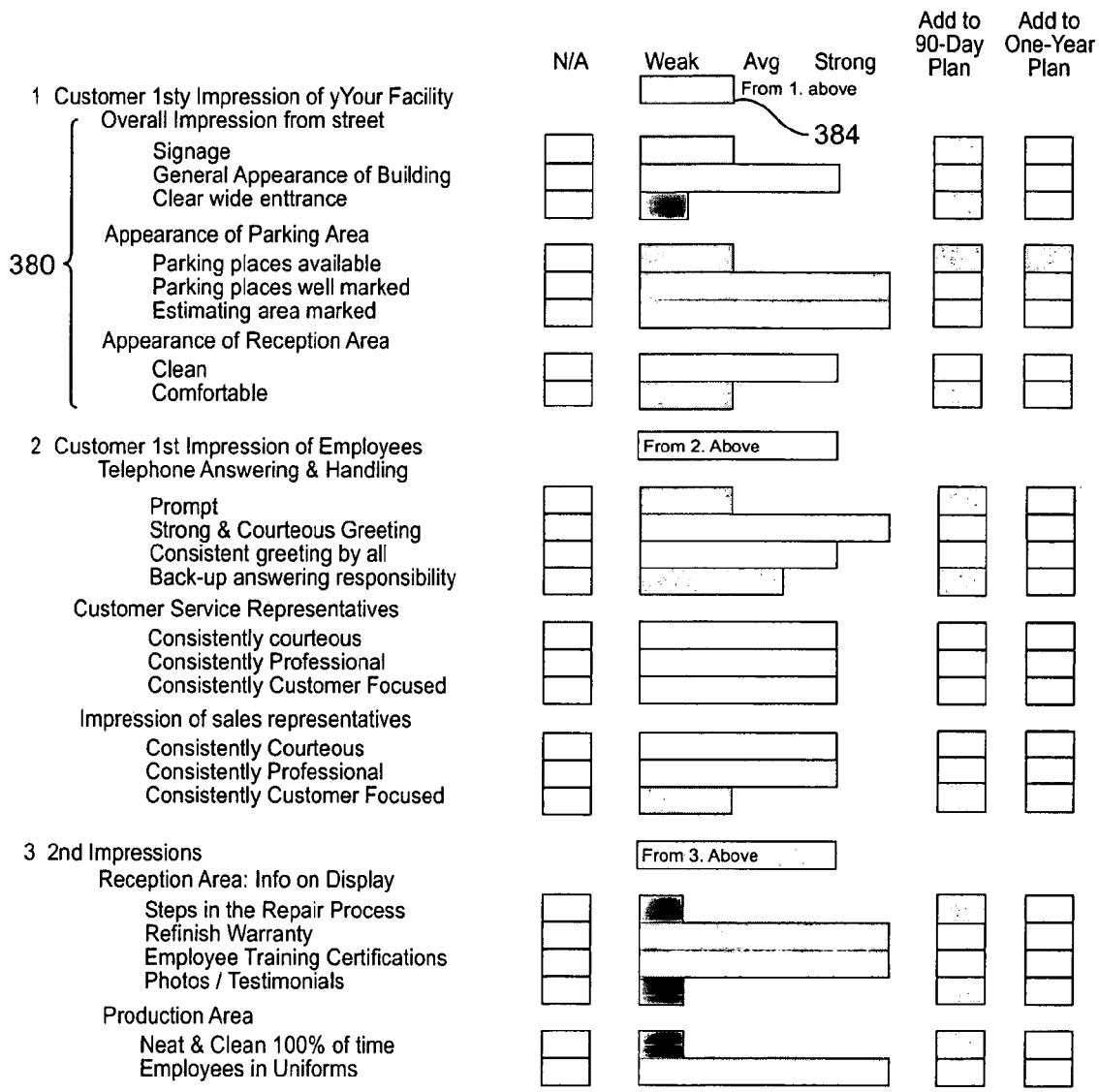
FIG. 8 is a computer screen display displaying the result of entering data via the computer screen display of FIG. 7.

FIG. 8 provides an example of the present invention generating results after the user has provided information to the questions presented in FIG. 7. For example, the signage question produced a weak response, the general appearance of the building produced a relatively strong response, while the clear and wide entrance question produced a very weak response. These responses as well as the other responses associated with the questions of region 380 contributed to a customer's first impression of the facility as being weak as shown by reference numeral 384. The user selected both the signage as well as clear and wide entrance questions to be added to the 90-day business plan.

FIG. 9 shows the same computer screen as FIG. 6, however populated with information supplied by the user. The results of the responses supplied by the user on FIG. 9 shows the strength indicator relative to the customer's first impression of your facility by reference numeral 384. In this example, the user has supplied other information that the present invention is used to generate the strength indicators for the remaining business aspects in FIG. 9.

FIGS. 10a and 10b show another example of the present invention acquiring data in order to provide business analysis to the user. The computer screen depicted in FIGS. 10a and 10b shows a customer data entry form for providing detailed information about the user as well as sales information and how many technicians work, on which days, for how many hours, and for which shift. This information is aggregated by the present invention and shown to the user in the succinct format depicted in FIG. 4.

The invention being thus described, it will be obvious that the same may be varied in many ways. Such variations are not to be regarded as a departure from the spirit and scope of the invention and all such modifications that would be obvious to one skilled in the art are intended to be included within the scope of the following claims. For example, the present invention is not limited to vehicle collision repair shops, but extends to other multi-process vehicle operations or multi-process non-vehicle operations, such as but not limited to vehicle sales operations. For example, a vehicle sales operation shop uses the present invention to analyze its business relative to performance, priorities, projections, and production workforce shift profiles.

What is claimed is:

1. A method of analyzing and prioritizing a vehicle-related business utilizing a computerized analysis module and a computerized transaction module with the analysis module having a plurality of data entry forms, said method comprising the steps of:

determining a number of categories for the vehicle-related business and storing the categories in the analysis module with each of the categories defining a different priority for the vehicle related business;

associating at least one data entry form with each of the categories with each data entry form including a plurality of questions relevant to each particular category;

linking each of the categories to the associated data entry form through the analysis module;

inputting rankings into said questions of said data entry form linked to a particular category by answering said questions;

automatically calculating a strength of the particular category through the analysis module with said strength being based upon the inputted rankings of said questions;

utilizing the analysis module to assign a strength indicator for the particular category based upon the inputs and calculations;

linking the transaction module to the analysis module;

tracking equipment used by the vehicle-related business through the transaction module;

identifying a problem associated with the use of the equipment; and automatically recommending to the vehicle-related business the purchase of additional equipment or services such that the vehicle-related business can operate at an increased proficiency.

2. The method as set forth in claim 1 wherein the categories are selected from the group consisting of financial measures, financial performance, sales and marketing, customer satisfaction index, insurance relations including cycle time, administration general, administration parts, production general, production refinish, facility, personnel including pay plans and incentives, and combinations thereof.

3. The method as set forth in claim 1 further comprising the step:
sending the data entry forms over a network to a memory of the computerized analysis module.

4. The method as set forth in claim 3 wherein the network is a global communications network connected by common protocols.

5. The method as set forth in claim 4 wherein the network is Internet.

6. The method as set forth in claim 1 wherein the step of inputting rankings is further defined as inputting not applicable, weak, average, or strong into the plurality of questions on the data entry form.

7. The method as set forth in claim 1 wherein the strength indicators are further defined as five distinct identifiers and wherein the step of assigning a strength indicator is further defined as assigning one of the five distinct identifiers for the particular category.

8. The method as set forth in claim 7 wherein the five distinct identifiers range from a low strength identifier defined as priority, to a high strength identifier defined as strength, and wherein the step of assigning a strength indicator is further defined as assigning the priority identifier, the strength identifier, or one of the three identifiers therebetween.

9. A method of analyzing and prioritizing a vehicle-related business utilizing a computerized analysis module having a plurality of data entry forms, said method comprising the steps of:

determining a number of categories for the vehicle-related business and storing the categories in the analysis module with each of the categories defining a different priority for the vehicle related business;

associating at least one data entry form with each of the categories with each data entry form including a plurality of questions relevant to each particular category;

linking each of the categories to the associated data entry form through the analysis module;

inputting rankings into said questions of said data entry form linked to a particular category by answering said questions;

automatically calculating a strength of the particular category through the analysis module with said strength being based upon the inputted rankings of said questions;

utilizing the analysis module to assign a strength indicator for the particular category based upon the inputs and calculations;

determining a number of financial performance factors for the vehicle-related business;

storing the financial performance factors in the analysis module;

determining a number of financial performance factors for comparable vehicle-related businesses to define industry guidelines;

storing the industry guidelines in the analysis module; and generating a business summary report utilizing the analysis module by simultaneously displaying the categories and associated strength indicators, the financial performance factors, and the industry guidelines.

10. The method as set forth in claim 9 wherein the performance factors are selected from the group consisting of total sales, total gross profit percent, production productivity, production staffing density, monthly sales per administrative employee, monthly sales per estimator, paint cost per paint hour billed, monthly gallons waste per paint technician, overall customer satisfaction index, gross profit amount per technician clock hour, and combinations thereof.

11. The method as set forth in claim 9 wherein the vehicle-related business includes a facility to perform at least one step of a multi-step process, said method further comprising the step of:
storing a production workforce shift profile in the analysis module in order to summarize product workforce shifts related to perform better utilization of the facility for the vehicle-related business.

12. The method as set forth in claim 9 further including the step of:
determining a number of performance factors for a top percentage of comparable vehicle-related businesses and storing the performance factors for the top percentage in the analysis module.

13. The method as set forth in claim 12 further including the steps of:
comparing the performance factors of the vehicle-related business to the top percentage of comparable vehicle-related businesses; and
assigning an opportunity for improvement if the comparison reveals that the performance factors of the vehicle-related business are less than the top percentage of comparable vehicle-related businesses.

14. The method as set forth in claim 9 further including the steps of:
comparing the performance factors of the vehicle-related business to the industry guidelines; and assigning an opportunity for improvement if the comparison reveals that the performance factors of the vehicle-related business are less than the industry guidelines.

15. The method as set forth in claim 9 further including the step of determining a number of projections for the vehicle-related business and storing the projections in the analysis module.

16. The method as set forth in claim 15 wherein the projections are selected from the group consisting of production proficiency improvement, additional technicians, parts to labor ratio improvement, labor gross profits improvement, parts gross profit improvement, materials gross profit improvement, cumulative impact of all improvements, and combinations thereof.

17. The method as set forth in claim 15 further including the steps of:

correlating a projection with a performance factor for the vehicle-related business; and calculating an improvement of the performance factor based on the projection.

18. The method as set forth in claim 17 wherein the projection includes a percent increase of the performance factor and wherein the step of calculating an improvement is further defined as calculating a percent increase of the performance factor.

* * * * *